United States Patent
Huebner et al.

(10) Patent No.: US 9,174,582 B2
(45) Date of Patent: Nov. 3, 2015

(54) CARGO AREA RETENTION SYSTEM

(71) Applicant: Ford Global Technologies, LLC, Dearborn, MI (US)

(72) Inventors: Annette Lynn Huebner, White Lake, MI (US); Artur Sakarian, Birmingham, MI (US); Ryan Welch, Ottawa Lake, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 14/104,019

(22) Filed: Dec. 12, 2013

(65) Prior Publication Data
US 2015/0165979 A1   Jun. 18, 2015

(51) Int. Cl.
- *B60R 7/04* (2006.01)
- *B60R 5/04* (2006.01)
- *B60R 11/00* (2006.01)

(52) U.S. Cl.
CPC ......... *B60R 5/045* (2013.01); *B60R 2011/0015* (2013.01); *B60R 2011/0036* (2013.01); *B60R 2011/0082* (2013.01)

(58) Field of Classification Search
CPC .......... B60N 3/001; B60R 7/02; B60R 5/045; B60R 7/04; Y10S 224/925
USPC ............ 36/37.15, 37.5, 37.16, 24.44; 410/94; 296/37.15, 37.5, 37.16, 24.44
See application file for complete search history.

(56) References Cited

U.S. PATENT DOCUMENTS

| | | | |
|---|---|---|---|
| 2,082,181 A * | 6/1937 | Pressnall | 224/280 |
| 3,088,771 A * | 5/1963 | Weigle | 296/37.5 |
| 4,540,213 A | 9/1985 | Herlitz et al. | |
| 5,685,592 A | 11/1997 | Heinz | |
| 6,290,277 B1 * | 9/2001 | Spykerman et al. | 296/24.43 |
| 6,502,731 B1 | 1/2003 | Gehring et al. | |
| 6,502,900 B1 * | 1/2003 | Johnston | 297/188.06 |
| 6,607,241 B2 * | 8/2003 | Johnston | 297/188.06 |
| 6,874,667 B2 * | 4/2005 | Dykstra et al. | 224/498 |
| 8,057,141 B2 * | 11/2011 | Bernhardsson et al. | 410/94 |
| 8,814,245 B1 * | 8/2014 | Welch et al. | 296/37.16 |
| 2006/0102671 A1 * | 5/2006 | Fitzpatrick | 224/543 |
| 2013/0153523 A1 * | 6/2013 | Bernert et al. | 211/86.01 |
| 2015/0054299 A1 * | 2/2015 | Yoshizawa et al. | 296/37.16 |

FOREIGN PATENT DOCUMENTS

| | | |
|---|---|---|
| EP | 0667260 A1 | 8/1995 |
| EP | 0849119 A1 | 6/1998 |
| GB | 2323581 A | 9/1998 |

OTHER PUBLICATIONS

Earth Motorcars, "2009 Mercedes-Benz SI-Class AMG Sport for Sale in Addison TX," Aug. 13, 2013.

* cited by examiner

*Primary Examiner* — Pinel Romain
(74) *Attorney, Agent, or Firm* — Vichit Chea; Price Heneveld LLP

(57) ABSTRACT

A vehicular cargo retention system includes a first cargo retention rail pivotally coupled with a load floor. A second cargo retention rail is pivotally coupled with the load floor. The first cargo retention rail is configured to rotate to a position above the second cargo retention rail. First and second shelves are operably coupled to a vehicle seatback. The first and second shelves are operable between a stowed position, wherein each of the first and second shelves is generally coplanar with the seatback, and a deployed position, wherein the first and second shelves extend generally horizontally.

19 Claims, 4 Drawing Sheets

CARGO AREA RETENTION SYSTEM

FIELD OF THE INVENTION

The present invention generally relates to a cargo area for a vehicle, and more specifically, to a cargo area retention system for a vehicle.

BACKGROUND OF THE INVENTION

Various vehicles include storage areas that are undivided open spaces into which many different articles can be positioned. Certain storage areas include hooks, individual compartments, and other features that can be used to organize cargo that is placed within a cargo area of a vehicle, but have limited cargo storage options. Many of these features have a single use and limited functionality, wherein the cargo storage features are not adaptable to position cargo of varying orientations, sizes, or materials.

SUMMARY OF THE INVENTION

According to one aspect of the present invention, a vehicular cargo retention system includes a first cargo retention rail pivotally coupled with a load floor. A second cargo retention rail is pivotally coupled with the load floor. The first cargo retention rail is configured to rotate to a position above the second cargo retention rail. First and second shelves are operably coupled to a vehicle seatback. The first and second shelves are operable between a stowed position, wherein each of the first and second shelves is generally coplanar with the seatback, and a deployed position, wherein the first and second shelves extend generally horizontally.

According to another aspect of the present invention, a vehicular cargo retention system includes first and second cargo retention rails pivotally movable between raised and lowered positions relative to a load floor. The first cargo retention rail nests within the second cargo retention rail when in the lowered position. Retention straps are extendable from a seatback and removably attached with the first cargo retention rail. First and second shelves are disposed above the load floor and are operable between stowed and deployed positions.

In yet another aspect of the present invention, a vehicular cargo retention system includes first and second cargo retention rails pivotally movable between raised and lowered positions relative to a load floor. The first cargo retention rail and the second cargo retention rail are pivotal about the same pivot axis. Retention straps are removably attached with the first cargo retention rail. A recess is defined in the load floor and is configured to receive both the first and second retention rails.

In still another aspect of the present invention, a vehicular cargo retention system includes storage areas that are undivided open spaces into which many different articles can be positioned. The storage areas of the vehicular cargo retention system include hooks, individual compartments, and other features that can be used to organize cargo that is placed within a cargo area of a vehicle with a variety of cargo storage options. The cargo storage features are adaptable to position cargo of varying shapes and sizes in a variety of orientations and positions.

These and other aspects, objects, and features of the present invention will be understood and appreciated by those skilled in the art upon studying the following specification, claims, and appended drawings.

DETAILED DESCRIPTION OF EMBODIMENTS

Figure 1:
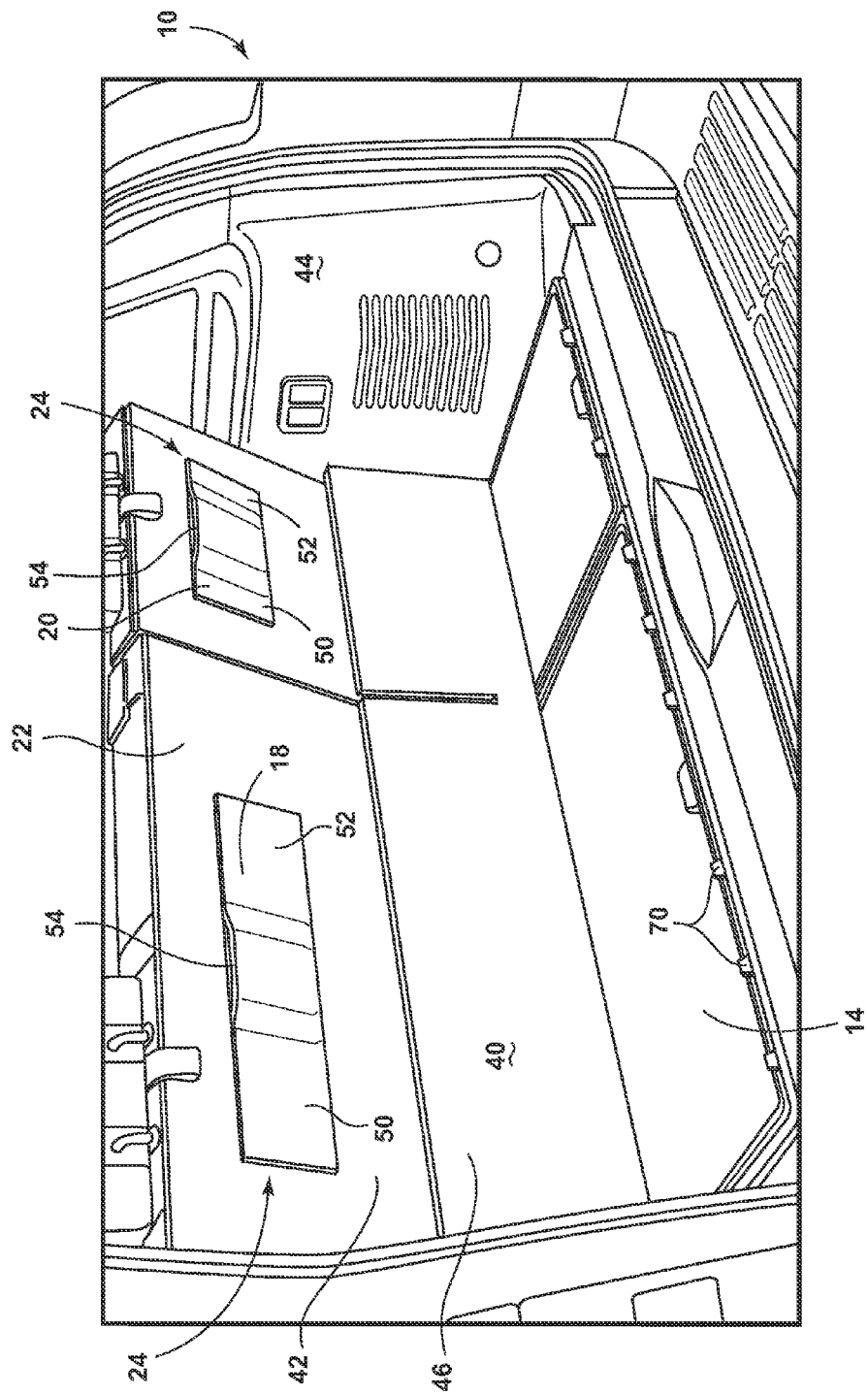
FIG. 1 is a top perspective view of an interior portion of a vehicle incorporating one embodiment of a vehicular cargo retention system of the present invention.
Figure 2:
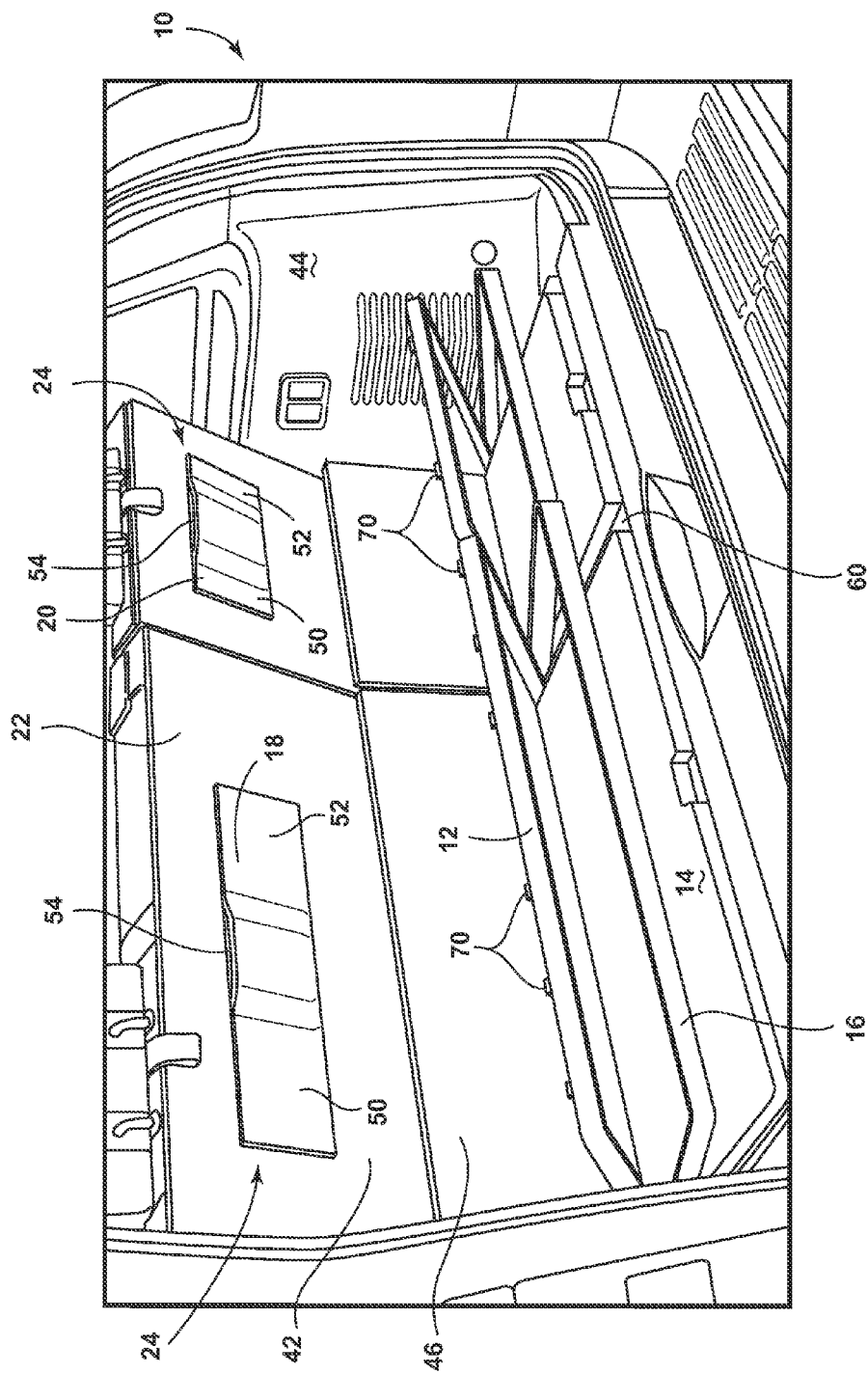
FIG. 2 is a top perspective view of the vehicular cargo retention system of FIG. 1 with first and second cargo retention rails in a raised position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicular cargo retention system having a first cargo retention rail 12 pivotally coupled with a load floor 14. A second cargo retention rail 16 is pivotally coupled with the load floor 14. The first cargo retention rail 12 is configured to rotate to a position above the second cargo retention rail 16. First and second shelves 18, 20 are operably coupled to a vehicle seatback 22. The first and second shelves 18, 20 are operable between a stowed position 24, wherein each of the first and second shelves 18, 20 is generally coplanar with the vehicle seatback 22 and a deployed position 26, wherein the first and second shelves 18, 20 extend generally horizontally.

Figure 3:
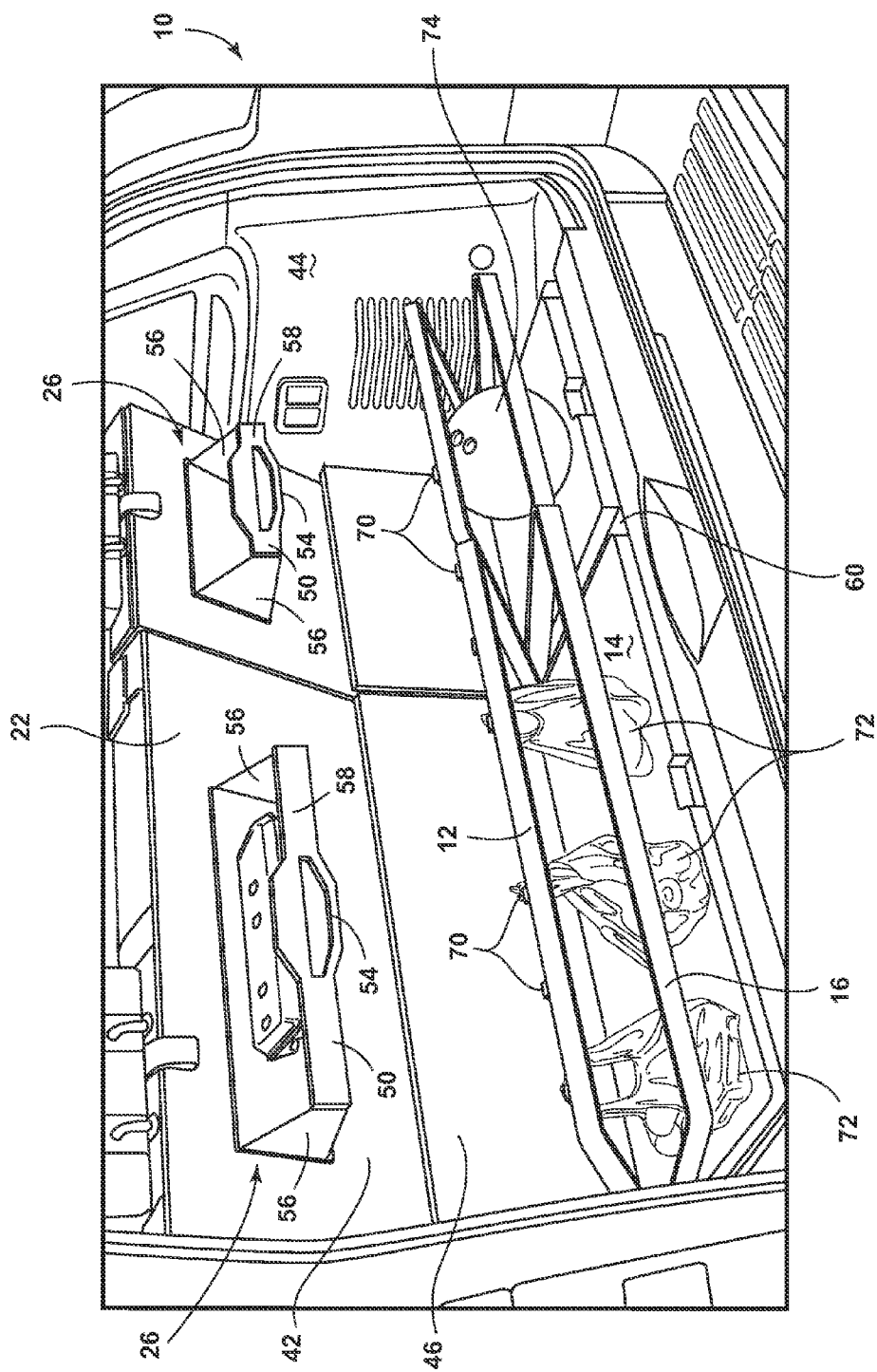
FIG. 3 is a top perspective view of the vehicular cargo retention system of FIG. 1 with first and second cargo retention rails supporting items and first and second shelves in a deployed position.

With reference to the embodiment illustrated in FIG. 1, the vehicular cargo retention system 10 is generally configured for use in a rear or a trunk area 40 of a vehicle. The vehicular cargo retention system 10 utilizes components that extend out of the load floor 14 of the vehicle, as well as from back panel members 42 of the vehicle seatback 22. The back panel members 42 and load floor 14 may be a hard plastic or include a fabric liner. It is also contemplated that interior sidewalls 44 of the vehicle could be used to provide supporting surfaces for the vehicular cargo retention system 10, and specifically, the first and second shelves 18, 20, as well as the first and second cargo retention rails 12, 16. In the illustrated embodiment, an abutment wall 46 is disposed between the load floor 14 and back panel members 42. It is contemplated that the abutment wall 46 may be pivotal between a vertical position (illustrated) and a horizontal position. It is also contemplated that the abutment wall 46 may be removed to provide even more space on the load floor 14. The first and second shelves 18, 20 are operably coupled to the vehicle seatback 22 and are moveable between the stowed position 24 (FIG. 2) and the deployed position 26 (FIG. 3). The first and second shelves 18, 20 include a supporting wall 50 that may be coplanar with the vehicle seatback 22 or extend in a plane that is substantially parallel with the planar extent of the vehicle seatback 22. The first and second shelves 18, 20 are generally pivotal about a bottom portion 52 of the first and second shelves 18, 20, and may include a stop that prevents the first and second shelves 18, 20 from being lowered below a generally horizontal position. In addition, the first and second shelves 18, 20 may include a grasping portion 54 in the supporting wall 50 that allows a user to easily grasp either of the first and second shelves 18, 20 and move the same from the stowed position 24 to the deployed position 26. In the illustrated embodiment, the grasping portion 54 is essentially located across a lateral extent of the first and second shelves 18, 20. However, it is also contemplated that the grasping portion 54 may be disposed on either end or even a side edge of the first and second shelves 18, 20 to aid a user in rotating the first and second shelves 18, 20 from the stowed position 24 to the deployed position 26. The first and second shelves 18, 20 also include sidewalls 56 and a retention wall 58.

With reference again to FIG. 1, the illustrated embodiment of the vehicular cargo retention system 10 includes a recess 60 in the load floor 14 configured to receive both the first and second cargo retention rails 12, 16. In the illustrated embodiment, the first cargo retention rail 12 nests within the second cargo retention rail 16 when the first and second cargo retention rails 12, 16 are in a lowered position. It is generally contemplated that the depth of the recess 60 is equal to or slightly larger than a thickness of the first and second cargo retention rails 12, 16, such that when the first and second cargo retention rails 12, 16 are in the stowed position 24, the load floor 14 is generally planar across a top surface of the load floor 14. In addition, it is contemplated that the first cargo retention rail 12 is closely received in the second cargo retention rail 16 and the first cargo retention rail 12 is configured to rotate to a position above the second cargo retention rail 16.

With reference again to FIG. 2, in the illustrated embodiment, the first and second cargo retention rails 12, 16 are shown pivoting about the same pivot axis. In addition, the first cargo retention rail 12 is shown in a position rotated further than the second cargo retention rail 16. As illustrated, the first cargo retention rail 12 is positioned above the second cargo retention rail 16. The first and second cargo retention rails 12, 16 can be locked in place, such that the first and second cargo retention rails 12, 16 can retain items positioned on the load floor 14. The first and second cargo retention rails 12, 16 may include ratcheting features such that the first and second cargo retention rails can be set at a variety of heights and angles relative to the load floor 14. In addition, the first cargo retention rail 12 includes a plurality of cargo support hooks 70. The cargo support hooks 70, as illustrated, are in a generally fixed position. However, it will be understood that the cargo support hook 70 may be deployable and retractable into the first cargo retention rail 12. Additionally, both the first cargo retention rail 12 and the second cargo retention rail 16 may include cargo support hooks 70. The cargo support hooks may extend forward, rearward or upward from the first or second cargo retention rail 12, 16. The cargo support hooks 70 can be used to support items 72 suspended therefrom (as shown in FIG. 3).

With reference now to FIG. 3, the first and second cargo retention rails 12, 16 are illustrated in a raised position. The first cargo retention rail 12 is illustrated as supporting a variety of cargo items 74. In addition, a second portion of the first and second cargo retention rails 12, 16 are illustrated maintaining a bowling ball in position on the load floor 14. The first and second cargo retention rails 12, 16 prevent the bowling ball from rolling about the trunk area 40 of the vehicle.

With reference again to FIG. 3, the first and second shelves 18, 20 are illustrated in the deployed position 26. The grasping portion 54 is illustrated, which includes a slight indent in both the first and second shelves 18, 20. The first shelf 18 is shown storing cargo items 74, such as eggs, in the first shelf 18. The retention wall 58 of the first and second shelves 18, 20 is configured to retain cargo items 74 placed on the first and second shelves 18, 20. It is contemplated that the first and second cargo retention rails 12, 16 may be made of a variety of materials, including polymeric materials and metals, such as steel. In addition, it is also contemplated that the first and second cargo retention rails 12, 16 may include a flexible elastomeric material on an inner portion thereof configured to absorb energy by moving objects disposed on the load floor 14 which abut the first and second cargo retention rails 12, 16 during travel.

Figure 4:
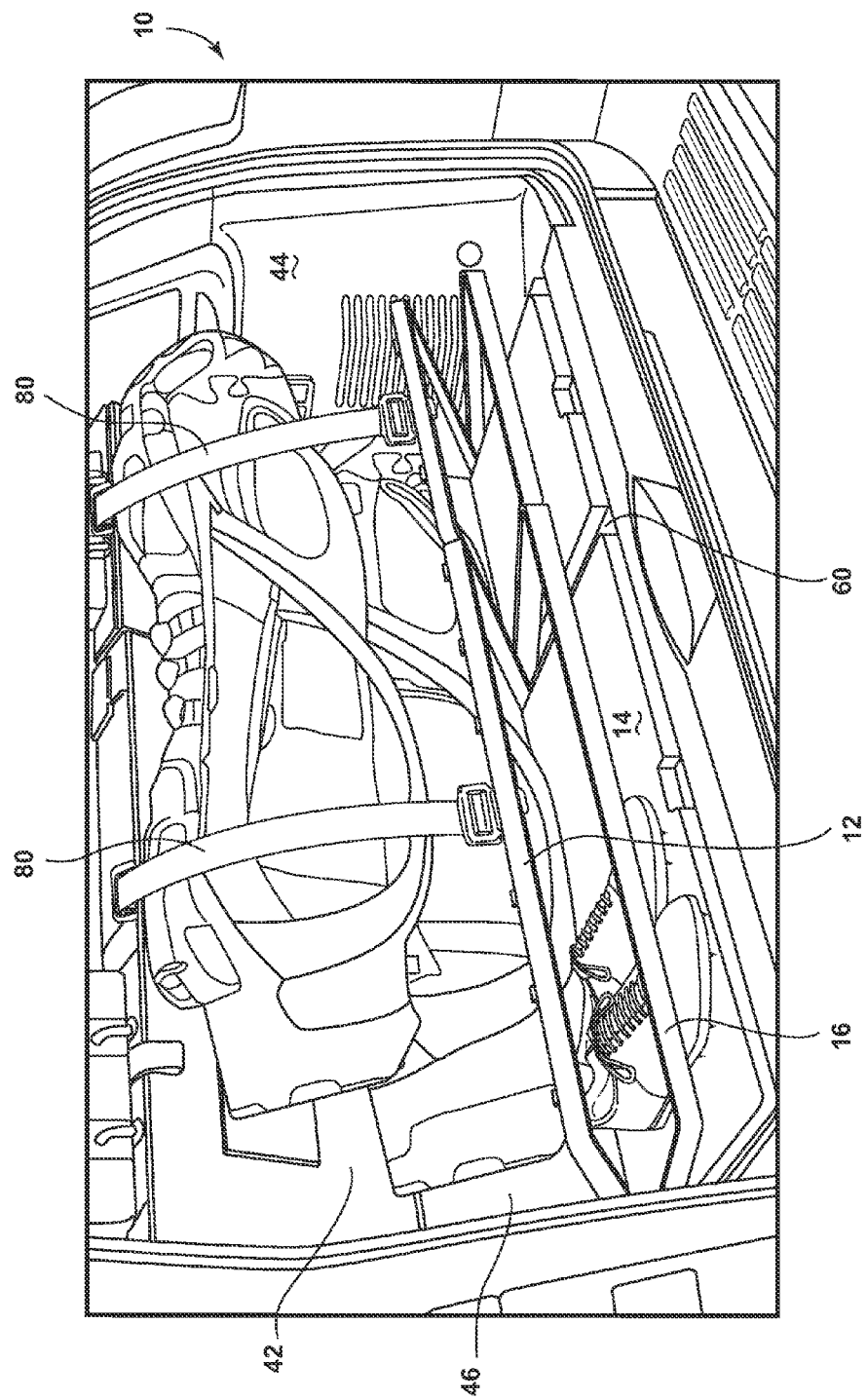
FIG. 4 is a top perspective view of the vehicular cargo retention system of FIG. 1 with first and second cargo retention rails in a raised position and retention straps removably coupled with the first cargo retention rail.

Referring now to FIG. 4, in another embodiment of the vehicular cargo retention system 10, retention straps 80 are provided that are extendable from the vehicle seatback 22. The retention straps 80 are designed to function in a similar fashion to a seatbelt and be positioned on a retractable spindle. The retention straps 80 are designed to be withdrawn by a user and engage with the first cargo retention rail 12, such that items can be positioned in the trunk area 40 of the vehicle and retained in place by the retention straps 80 that are engaged with the first cargo retention rail 12. In the illustrated embodiment shown in FIG. 4, golf shoes are illustrated as being retained by the first and second cargo retention rails 12, 16 and first and second golf bags are shown retained by the retention straps 80. The retention straps 80 may include hooks on a deployable end thereof, designed to engage the first cargo retention rail 12. Alternatively, the retention straps 80 may include an aperture designed to engage a hook on the first cargo retention rail 12, thereby maintaining secure engagement therewith.

In another embodiment of the present invention, the vehicular cargo retention system 10 includes storage areas that are undivided open spaces into which many different articles can be positioned. The storage areas of the vehicular cargo retention system 10 include hooks, individual compartments, and other features that can be used to organize cargo that is placed within a cargo area of a vehicle with a variety of cargo storage options. The cargo storage features are adaptable to position cargo of varying orientations, sizes, or materials.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicular cargo retention system comprising:
   a first cargo retention rail pivotally coupled with a load floor;
   a second cargo retention rail pivotally coupled with the load floor, wherein the first cargo retention rail is configured to rotate to a position above the second cargo retention rail, and wherein the first cargo retention rail and second cargo retention rail pivot about the same axis;
   first and second shelves operably coupled to a vehicle seatback, the first and second shelves being operable between a stowed position, wherein each of the first and second shelves is generally coplanar with the seatback, and a deployed position, wherein the first and second shelves extend generally horizontally.

2. The vehicular cargo retention system of claim 1, further comprising:
   deployable retention straps extendable from a top portion of a seatback and configured to engage the first cargo retention rail.

3. The vehicular cargo retention system of claim 1, further comprising:
   cargo support hooks disposed on the first cargo retention rail.

4. The vehicular cargo retention system of claim 1, wherein the first cargo retention rail nests inside the second cargo retention rail when both the first cargo retention rail and the second cargo retention rail are in the stowed position.

5. The vehicular cargo retention system of claim 4, further comprising:
   a recess defined in the load floor, the recess being configured to receive both the first and second retention rails when in the stowed position.

6. The vehicular cargo retention system of claim 1, wherein each of the first and second shelves includes a retention wall on a forward edge thereof.

7. The vehicular cargo retention system of claim 1, wherein each of the first and second shelves includes flexible sidewalls that are configured to fold against the seatback when the first and second shelves are in the stowed position.

8. A vehicular cargo retention system comprising:
   first and second cargo retention rails pivotally movable between raised and lowered positions relative to a load floor, the first cargo retention rail nesting within the second cargo retention rail when in the lowered position, and wherein the first cargo retention rail and the second cargo retention rail are pivotal about the same pivot axis;
   retention straps extendable from a seatback and removably attached with the first cargo retention rail; and
   first and second shelves disposed above the load floor and operable between stowed and deployed positions.

9. The vehicular cargo retention system of claim 8, wherein the retention straps include hook features configured to engage the first cargo retention rail.

10. The vehicular cargo retention system of claim 8, further comprising:
    cargo support hooks disposed on one of the first cargo retention rail and the second cargo retention rail.

11. The vehicular cargo retention system of claim 8, further comprising:
    a recess defined in the load floor, the recess being configured to receive both the first and second retention rails when in the stowed position.

12. The vehicular cargo retention system of claim 8, wherein each of the first and second shelves includes a retention wall on a forward edge thereof.

13. The vehicular cargo retention system of claim 8, wherein each of the first and second shelves includes flexible sidewalls that are configured to fold against the seatback when the first and second shelves are in the stowed position.

14. A vehicular cargo retention system comprising:
    first and second cargo retention rails pivotally movable between raised and lowered positions relative to a load floor, the first cargo retention rail and the second cargo retention rail being pivotal about the same pivot axis;
    retention straps removably attached with the first cargo retention rail; and
    a recess defined in the load floor and configured to receive both the first and second retention rails.

15. The vehicular cargo retention system of claim 14, wherein the retention straps include hook features configured to engage the first cargo retention rail.

16. The vehicular cargo retention system of claim 14, further comprising:
    cargo support hooks disposed on one of the first cargo retention rail and the second cargo retention rail.

17. The vehicular cargo retention system of claim 14, further comprising:
    at least one shelf disposed above the first and second cargo retention rails.

18. The vehicular cargo retention system of claim 17, further comprising:
    a retention wall disposed on a forward edge of the at least one shelf.

19. The vehicular cargo retention system of claim 17, wherein the at least one shelf includes flexible sidewalls configured to fold against the vehicle seatback when the at least one shelf is in a stowed position.

* * * * *